US007499262B1

(12) United States Patent
Darr

(10) Patent No.: US 7,499,262 B1
(45) Date of Patent: Mar. 3, 2009

(54) POWER DISTRIBUTION BUS BAR

(75) Inventor: Christopher J. Darr, Livonia, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 11/853,146

(22) Filed: Sep. 11, 2007

(51) Int. Cl.
*H02B 1/26* (2006.01)

(52) U.S. Cl. ...................................... 361/626; 439/76.2

(58) Field of Classification Search ................. 361/626, 361/624, 622; 439/76.2, 949, 212, 213
See application file for complete search history.

(56) References Cited

U.S. PATENT DOCUMENTS 4,842,534 A 6/1989 Mobley et al.
4,981,449 A * 1/1991 Buchter ...................... 439/724
5,995,380 A 11/1999 Maue et al.
6,126,457 A * 10/2000 Smith et al. ................ 439/76.2
6,679,708 B1 * 1/2004 Depp et al. ................ 439/76.2
6,719,572 B2 4/2004 Seo et al.
6,824,398 B2 * 11/2004 Hara ......................... 439/76.2
6,887,084 B2 5/2005 Saito et al.
7,175,488 B2 2/2007 Pavlovic et al.
7,283,366 B2 * 10/2007 Yamashita .................. 361/719
7,320,608 B2 * 1/2008 Kubota et al. .............. 439/76.1
7,364,449 B2 * 4/2008 Makino ...................... 439/212

* cited by examiner

*Primary Examiner*—Hae Moon Hyeon
(74) *Attorney, Agent, or Firm*—MacMillan, Sobanski & Todd, LLC

(57) ABSTRACT

In one aspect of the present invention, a power distribution bus bar that includes a first conductive bus bar configured to receive power from a power source. A plurality of stamped finger-like clamping members are integrally formed to the first conductive bus bar and configured to distribute power to a secondary high power bus bar within a power distribution box. The plurality of stamped finger-like clamping members apply a compression force to the secondary high power bus bar for securing the secondary high power bus bar within the power distribution box.

18 Claims, 4 Drawing Sheets

POWER DISTRIBUTION BUS BAR

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISC APPENDIX

Not Applicable

BACKGROUND OF THE INVENTION

1. Field of Invention

This invention relates in general to a vehicle power distribution box, and more specifically, to a serviceable power distribution module of the power distribution box.

2. Background of Related Art

A vehicle power distribution box is typically a relay block connected to a vehicle power source such as a battery for distributing power to various components of the vehicle. The power distribution box typically includes a casing having an open and closeable serviceable region. Power-supply conduits are typically routed through the bottom of the power distribution box and are connected to a bus bar in the casing via bolts. Power is distributed from the bus bar wires. Terminals connected to the ends of the wires are secured in the bottom of the box and are positioned in spaced relation to output terminals for electrical connection to the output terminals. Fuses or relays used to electrically connect the input terminals and output terminals are serviceable from the top of the power distribution box for electrically connecting the input power terminals to the output power terminals. Typically, high power connections, for example connections from the battery, require a terminal bolt-fastening operation. Such an operation creates assembly and servicing inefficiencies.

BRIEF SUMMARY OF THE INVENTION

The present invention has the advantage of providing a serviceable connection to a high power distribution module within the power distribution box. Each of the components within the module are detachable from one another minimizing the use of threaded fasteners thereby increasing assembly efficiency and service efficiency.

In one aspect of the present invention, a power distribution bus bar that includes a first conductive bus bar configured to receive power from a power source. A plurality of stamped finger-like clamping members are integrally formed to the first conductive bus bar and configured to distribute power to a secondary high power bus bar within a power distribution box. The plurality of stamped finger-like clamping members apply a compression force to the secondary high power bus bar for securing the secondary high power bus bar within the power distribution box.

In yet another aspect of the present invention, a power distribution box is provided for distributing power from a power source to vehicle electrical components. The power distribution box includes a power distribution box housing and a fastenerless detachable high power bus bar that includes a plurality of high-current fastenerless terminals for distributing power to output devices. The plurality of high-current fastenerless terminals each have an integrated fuse for terminating power across a respective high-current fastenerless terminal during a power overload condition. A plurality of housing connectors is inserted within the housing configured to electrically couple the plurality of high-current fastenerless terminals to an output device conduit. A power distribution box busbar receives power from the power source. The power distribution busbar includes a plurality of stamped finger-like clamping members for distributing power to the detachable high power bus bar. The plurality of stamped finger-like clamping members secures the detachable high power bus bar within the power distribution box.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
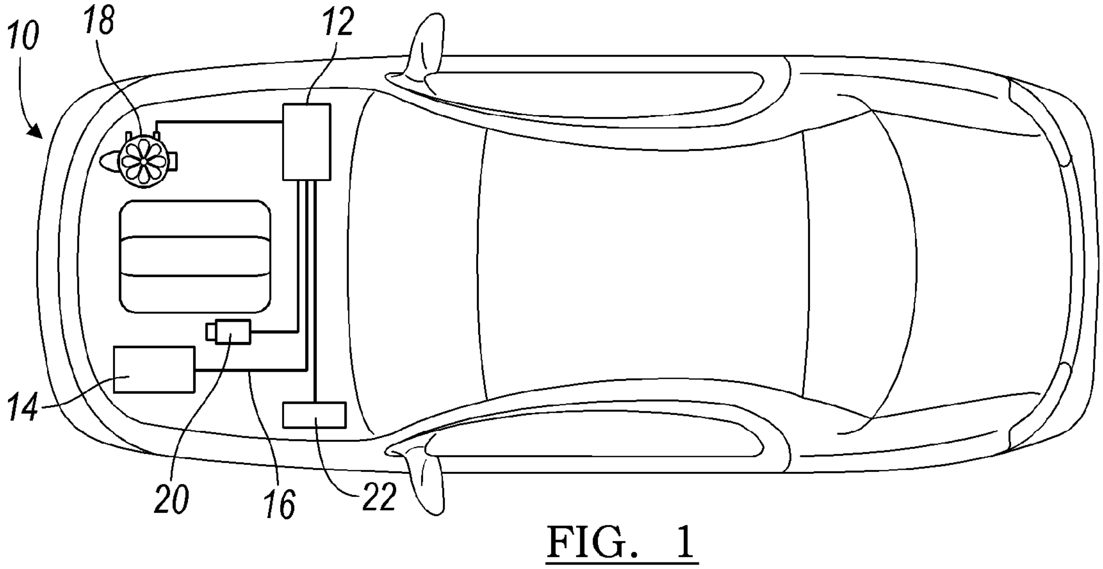
FIG. 1 is a plan view of a vehicle engine compartment of the present invention.

Referring now to the drawings, there is illustrated in FIG. 1 a vehicle 10 having a power distribution box (PDB) 12. The PDB 12 distributes power provided by a vehicle's power source, such as a vehicle battery, shown generally at 14.

The vehicle power source 14 is electrically connected to the PDB 12 via a power source conduit 16. The PDB 12 distributes power to various electrical devices within the engine compartment and throughout the vehicle 10. Examples of such electrical devices for which power may be provided from the PDB 12 include, but are not limited to, an alternator 18, an electric assist steering motor 20, and a smart power distribution junction box 22.

Figure 2:
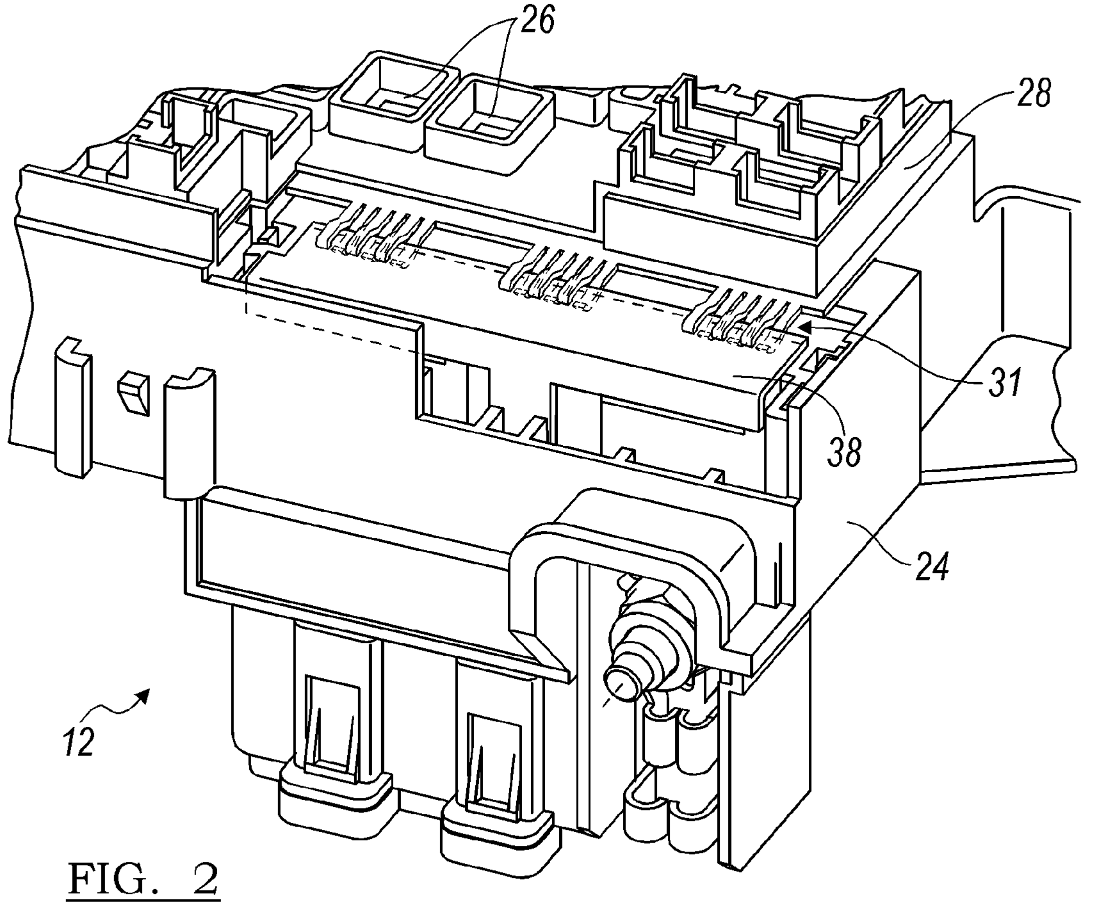
FIG. 2 illustrates a perspective view of a power distribution box of the present invention.

FIG. 2 illustrates a perspective view of the PDB 12. The PDB 12 includes a plastic, non-conductive housing 24. Electrical conduits are routed through the bottom of the housing 24 for coupling to terminals disposed within the housing 24. Respective input and output terminals disposed within the housing 24 are electrically connected to one another via a fusing device such as a relay or a fuse (not shown). The PDB 12 includes a plurality of mounting sockets 26 disposed in its upper surface 28. Respective female input terminals and female output terminals are secured within the mounting sockets 26. A respective fuse or relay is mounted within a respective set of mounting sockets 26 for distributing power from a respective input terminal to a respective output terminal.

The PDB 12 further includes a power distribution module 30. The power distribution module 30 is a detachable modular electronic device for receiving high input power from the vehicle battery 14 (shown in FIG. 1) and for distributing high power to a plurality of output devices. The power distribution module 30 is secured to the PDB 12 by a plurality of stamped finger-like clamping members 31 which will be discussed in detail below. The plurality of stamped finger-like clamping members 31 provides a fastenerless connection between the PDB 12 and the power distribution module 30. The substantial portion of the electrical connections to the power distribution module 30 is secured by fastenerless connections. Providing fastenerless connections to the power distribution module 30 reduces the assembly inefficiencies and service inefficiencies.

Figure 3:
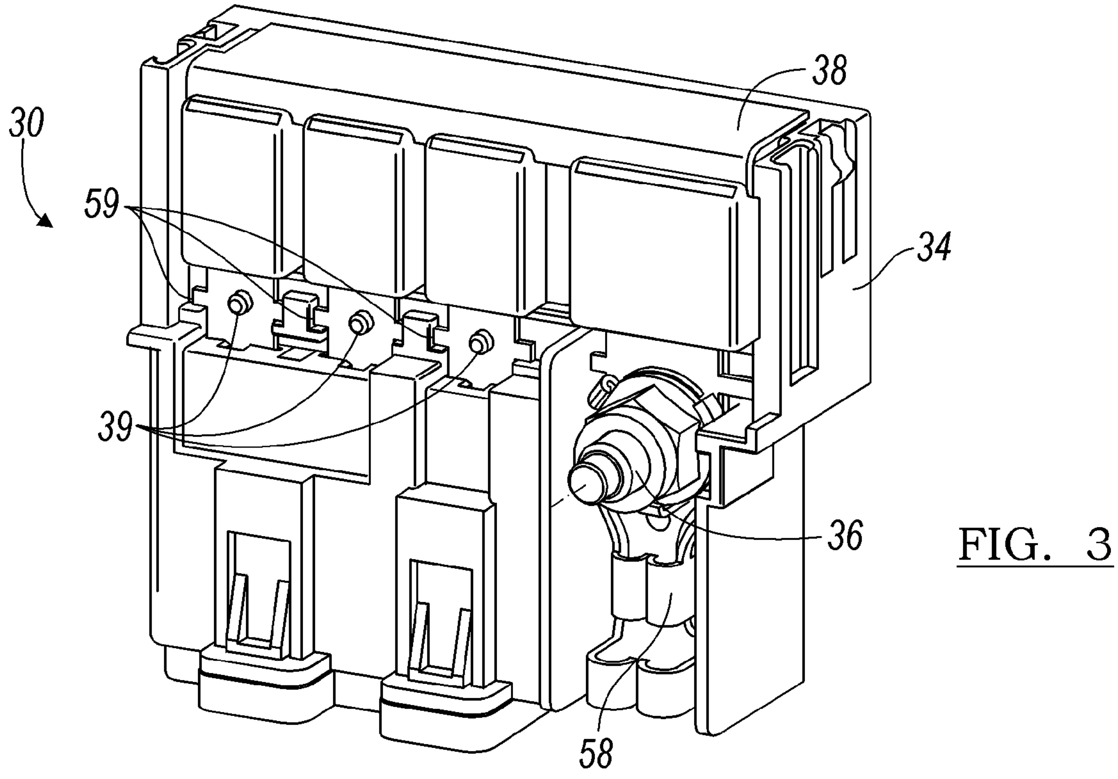
FIG. 3 illustrates a perspective view of a power distribution module of the present invention.
Figure 4:
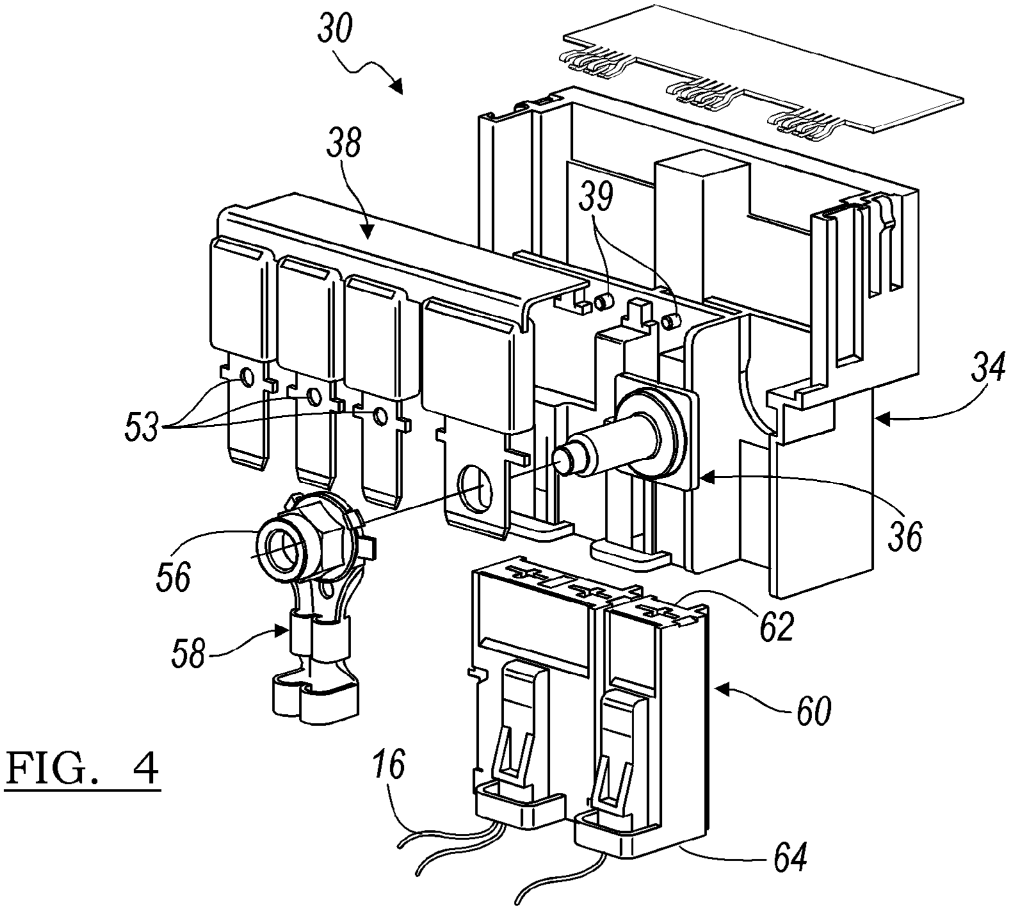
FIG. 4 illustrates an exploded view of the power distribution module of the present invention.

Referring now to both FIGS. 3 and 4, the power distribution module 30 includes a module housing 34 made of a non-conductive material such as plastic. A conductive stud 36 is secured to the module housing 34. The conductive stud 36 may be secured to the module housing 34 as part of an insert mold operation or the module housing 34 may include a slot for capturing the conductive stud 36 to the module housing 34.

A detachable high power bus bar 38 having a plurality of conductive terminals is secured to the module housing 34 via locating studs 39 which will be discussed in detail below. Alternatively, the detachable high power bus bar 38 may be secured to the PDB by a method other than the locating studs.

Figure 5:
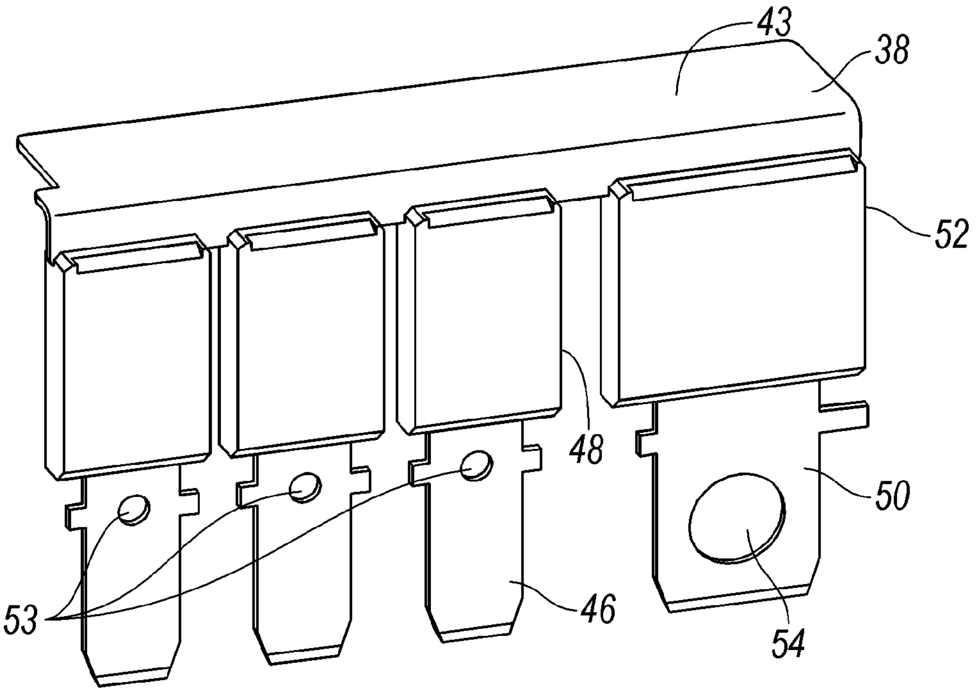
FIG. 5 illustrates a perspective view of a detachable high power bus bar of the present invention.

FIG. 5 illustrates an enlarged view of the detachable high power bus bar 38. The detachable high power bus bar 38 is preferably formed by a stamping operation. The detachable high power bus bar 38 includes a main body portion 43 and the plurality of conductive terminals. The main body portion 43 is formed at a substantially right angle to the plurality of conductive terminals for seating against the module housing 34 (shown in FIG. 3). A first high-current fastenerless terminal 46 distributes power received from the plurality of finger-like clamp members 31 to one of the output devices shown in FIG. 1. The first high-current fastenerless terminal 46 includes a fuse 48 integrated within the first high-current fastenerless terminal 46 for protection against a power overload condition. A second high-current terminal 50 distributes the power received from the plurality of finger-like clamp members 31 to the alternator 18 (shown in FIG. 1). The second high-current terminal 50 includes a fuse 52 integrated within the second high-current terminal 50 for protecting against a power overload condition. Alternatively, the detachable high power bus bar 38 may include additional high-current fastenerless terminals for distributing power to other various output devices. In addition, the first and second high-current fastenerless terminal 46 and other high current fastenerless terminals include apertures 53 for locating and securing the respective terminals on the module housing 34 to the locating studs 39.

Referring again to FIGS. 3-5, the second high-current terminal 50 of the detachable high power bus bar 38 includes an aperture 54 for receiving the conductive stud 36. A nut 56 secures a high power output conduit 58 to the second high-current terminal 50 and conductive stud 36 for distributing power from the power source 14 to the alternator 18 via the PDB 12 (shown in FIG. 1). The locating studs 39 of the module housing 34 are aligned with the apertures 53 of the plurality of terminals for locating and securing the plurality of high current terminals of the detachable high power bus bar 38 to the modular housing 34. The module housing 34 may also include locating guides 59 for locating the plurality of terminals of the detachable high power bus bar 38 within the module housing 34 during assembly.

A first plastic housing connector 60 is inserted within the module housing 34 for coupling the first high-current fastenerless terminal 46 to the power source conduit 16. The first plastic housing connector 60 utilizes a snap-fit connection for securing the first plastic housing connector 60 to the module housing 34. The plastic housing connector 60 includes a first terminal receiving end 62 for coupling to the first high-current fastenerless terminal 46. The first plastic housing connector 60 further includes a second terminal receiving end 64 configured to be coupled to the power source conduit 16. Alternatively, an additional plastic housing connector may be inserted within the housing for coupling additional respective high current fastenerless terminals to respective output device conduits. Moreover the plastic housing connector may include a plurality of receiving slots for accommodating a plurality of high-current fastenerless terminals.

Figure 6:
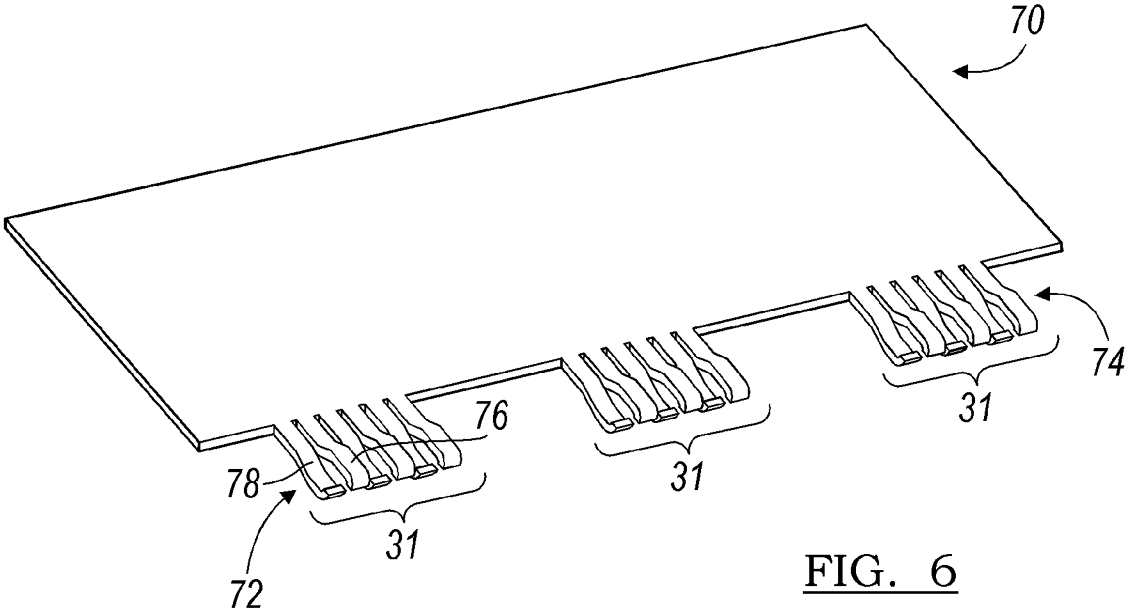
FIG. 6 illustrates a perspective view of a power distribution bus bar of the present invention.

FIG. 6 illustrates a perspective view of a power distribution bus bar 70 including the plurality of finger-like clamp members 31. The plurality of finger-like clamp members 31 are segregated into sets of finger-like clamp members. As shown in FIG. 6, the power distribution bus bar 70 includes a first set 72 and a second set 74. Alternatively, the power distribution bus bar 70 may include additional sets to secure the detachable high power bus bar 38 to the power distribution bus bar 70. Each respective set of finger-like clamp members include a plurality finger-like members, preferably formed from a stamping operation, although other processes may be used to form the plurality of finger-like members. A respective set of finger-like members includes an upper group of finger-like members 76 and an opposing lower group of finger-like members 78. Each of the finger-like members have an arcuate shape and are resilient for allowing the detachable high power bus bar 38 to be disposed between the upper group of finger-like members 76 and the lower group of finger-like members 78. Preferably each respective finger-like member of the upper group 76 alternates with a respective finger-like member of the lower group 78 for forming a respective clamping member which allows an equal force to be exerted on the attaching power bus bar 38 as it is inserted between the upper group 76 and lower group 78. The resiliency of the each respective finger-like member exerts a restorative force against the detachable high power bus bar 38 thereby holding the detachable high power bus bar 38 in compression between the first group 76 and the second group 78.

Figure 7:
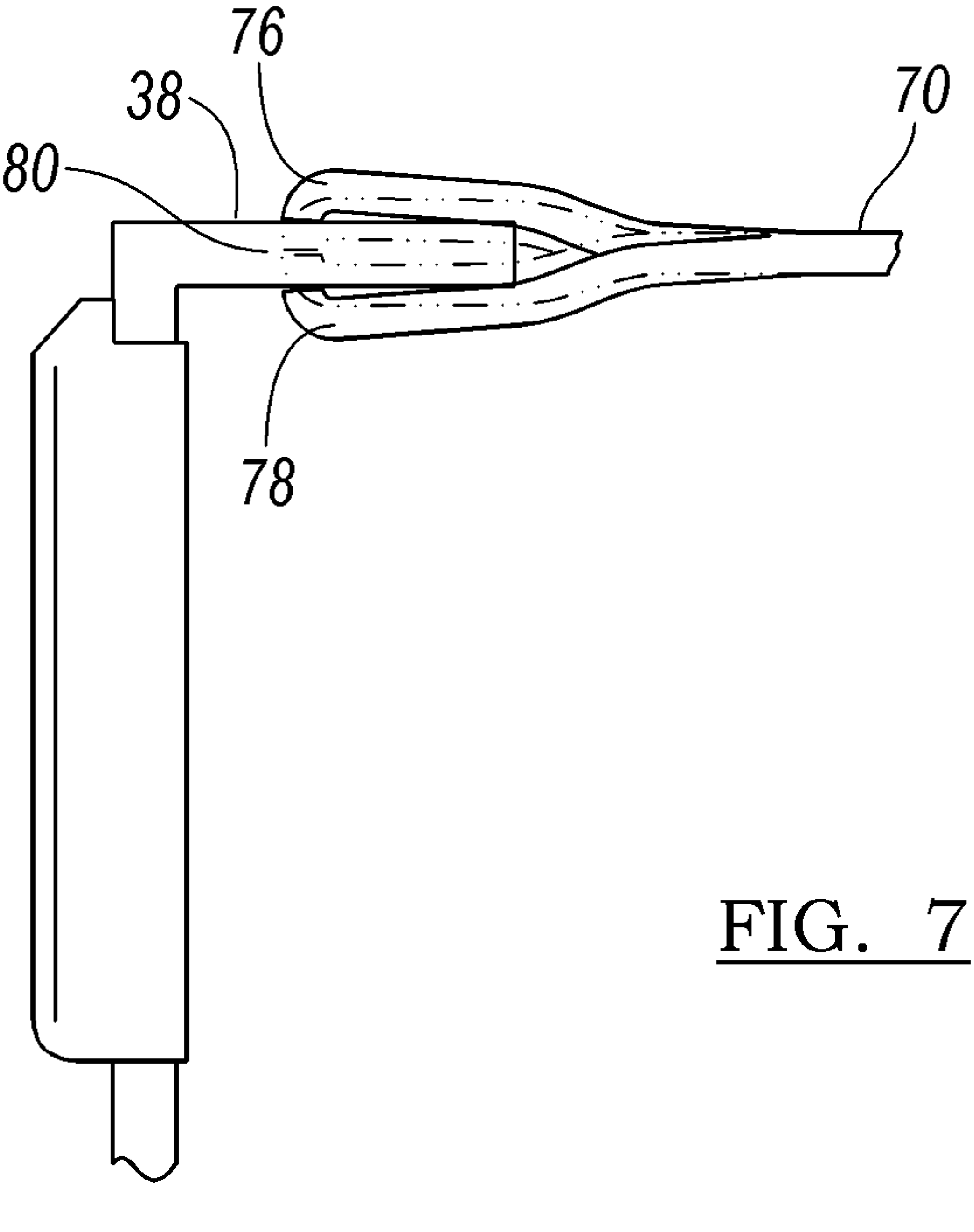
FIG. 7 illustrates a side view of the detachable high power bus bar of the present invention.

FIG. 7 illustrates a side view detachable high power bus bar 38 coupled to the power distribution bus bar 70. A clamping section 80 of the detachable high power bus bar 38 is inserted between the upper group 76 and the lower group 78 of a respective finger-like clamp member. A compression force is exerted on the detachable power bus bar 38 by the upper group 76 and lower group 78 for securing the detachable power bus bar 38 therebetween. In addition the secured connection between the plurality of finger-like clamping members provides a tight electrical connection that minimizes arcing across the two electrical distribution devices. This slip fit connection between the power distribution bus bar 70 and the detachable high power bus bar 38 eliminates the use of fasteners which reduces the overall cost of the electrical distribution system.

The fastenerless connections provide for increased assembly efficiency and service efficiency while providing a secure attachment between the high power coupling devices. As a result, the power source conduit and output device conduits may be easily detached from the power distribution module. Moreover, the power distribution module may be easily serviced if parts require changing since module itself is easily removable from the PDB in addition to the components being easily serviceable from the housing of the power distribution module.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A power distribution bus bar comprising:

a first conductive bus bar configured to receive power from a power source;

a plurality of clamping members integrally formed to the first conductive bus bar and configured to distribute power to a second conductive bus bar within a power distribution box, wherein the plurality of clamping members are formed as sets of clamping members, each set of clamping members includes a first group of clamping members and a second group of clamping member, and each respective clamping member of the first group alternates with a respective clamping member of the second group for applying a compression force to the second conductive bus bar for securing the second conductive bus bar within the power distribution box.

2. The power distribution bus bar of claim 1 wherein each set of clamping members includes at least four respective clamping members.

3. The power distribution bus bar of claim 1 wherein each of the clamping members is arcuate shaped.

4. A power distribution box for distributing power from a power source to vehicle electrical components, the power distribution box comprising:

a power distribution box housing;

a detachable bus bar disposed within the power distribution box housing, the detachable bus bar including a plurality of fastenerless terminals for distributing power to output devices, the plurality of fastenerless terminals each having an integrated fuse for terminating power across a respective fastenerless terminal during a power overload condition;

a plurality of housing connectors inserted within the power distribution box housing configured to electrically couple the plurality of fastenerless terminals to an output device conduit; and a power distribution box bus bar for receiving power from the power source, the power distribution bus bar includes a plurality of clamping members for distributing power to the detachable bus bar, wherein the plurality of clamping members secure the detachable bus bar within the power distribution box housing.

5. The power distribution box of claim 4 wherein the housing further comprises an electrically conductive stud that is configured for attachment to an output conduit, wherein the detachable bus bar further comprises a terminal having an aperture for receiving the conductive stud, the terminal providing power to the output conduit via the conductive stud.

6. The power distribution box of claim 5 wherein the conductive stud is configured to secure the output conduit to the detachable bus bar.

7. The power distribution box of claim 5 wherein the conductive stud is configured to provide power to an alternator.

8. The power distribution box of claim 4 further comprising a module housing configured to support the detachable bus bar, wherein the module housing is configured to be inserted within the power distribution box housing.

9. The power distribution box of claim 8 wherein the plurality of housing connectors are detachable from the module housing.

10. The power distribution box of claim 4 wherein the module housing includes locating studs for locating the plurality of terminals of the bus bar on the module housing.

11. The power distribution box of claim 4 wherein the module housing includes locating guides for locating the bus bar within the module housing.

12. The power distribution box of claim 4 wherein the detachable bus bar further includes a main body portion, wherein the main body portion extends at substantially a right angle to the plurality of fastenerless terminals for seating against the module housing.

13. A power distribution box for distributing power from a power source to vehicle electrical components, the power distribution box comprising:

a power distribution box housing;

a first bus bar disposed within the power distribution box housing, the first bus bar including a plurality of terminals for distributing power to output devices, the plurality of terminals each having an integrated fuse for terminating power across a respective terminal during a power overload condition;

a plurality of housing connectors inserted within the power distribution box housing configured to electrically couple the plurality of terminals to an output device conduit; and a second bus bar for receiving power from the power source, the second bus bar including a plurality of clamping members for distributing power to the first bus bar, wherein the plurality of clamping members secure the first bus bar within the power distribution box housing.

14. The power distribution box of claim 13 wherein the plurality of terminals are fastenerless terminals.

15. The power distribution box of claim 14 wherein the first bus bar includes a fastening terminal having an aperture, and wherein an electrically conductive stud is integrated within the power distribution box housing and is configured for attachment to an output conduit, wherein the conductive stud is electrically inserted through the aperture for electrically coupling the output conduit to the fastening terminal.

16. The power distribution box of claim 14 further comprising a module housing configured to support the first bus bar, wherein the module housing is configured to be inserted within the power distribution box housing, wherein the plurality of housing connectors are detachable from the module housing.

17. The power distribution box of claim 13 wherein the plurality of clamping members are formed as sets of clamping members, each set of clamping members includes a first group of clamping members and a second group of clamping members, each respective clamping member of the first group alternates with a respective clamping member of the second group, wherein each of the sets of clamping members apply a compression force to the first bus bar for securing the first bus bar within the power distribution box.

18. The power distribution box of claim 13 further comprising a module housing configured to support the first bus bar, wherein the module housing is configured to be inserted within the power distribution box housing.

* * * * *